(12) United States Patent
Abouzied et al.

(10) Patent No.: US 10,664,001 B2
(45) Date of Patent: May 26, 2020

(54) RF SQUARE-LAW CIRCUIT

(71) Applicant: QUALCOMM Incorporated, San Diego, CA (US)

(72) Inventors: Mohamed Abouzied, La Jolla, CA (US); Rajagopalan Rangarajan, San Diego, CA (US); Peter Shah, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/356,435

(22) Filed: Mar. 18, 2019

(65) Prior Publication Data

US 2020/0073428 A1    Mar. 5, 2020

Related U.S. Application Data

(60) Provisional application No. 62/725,911, filed on Aug. 31, 2018.

(51) Int. Cl.
| | | |
|---|---|---|
| G06G 7/20 | (2006.01) | |
| G06F 7/44 | (2006.01) | |
| G06F 7/552 | (2006.01) | |
| G05F 3/26 | (2006.01) | |
| H04B 17/13 | (2015.01) | |
| G05F 3/24 | (2006.01) | |

(52) U.S. Cl.
CPC ............. G05F 3/262 (2013.01); G05F 3/242 (2013.01); H04B 17/13 (2015.01)

(58) Field of Classification Search
CPC .......... G05F 3/262; G05F 3/242; H04B 17/13
See application file for complete search history.

(56) References Cited

U.S. PATENT DOCUMENTS

| | | | | |
|---|---|---|---|---|
| 4,374,357 A * | 2/1983 | Olesin | ..................... | G05F 3/247 323/284 |
| 4,694,201 A * | 9/1987 | Jason | ............. | H03K 19/018521 323/315 |
| 7,656,229 B2 * | 2/2010 | Deng | ..................... | H03F 1/223 330/149 |
| 2014/0266444 A1 * | 9/2014 | Scott | ..................... | H03F 1/0227 330/257 |

* cited by examiner

*Primary Examiner* — Kenneth B Wells
(74) *Attorney, Agent, or Firm* — Haynes and Boone LLP/QUALCOMM Incorporated

(57) ABSTRACT

A circuit includes a first transistor that conducts a first current responsive to a DC bias voltage and an RF signal. A second transistor conducts a second current responsive to the DC bias voltage. The first current and the second current are mirrored through a pair of current mirrors coupled together through a low-pass filter to filter the envelope of the RF signal.

20 Claims, 5 Drawing Sheets

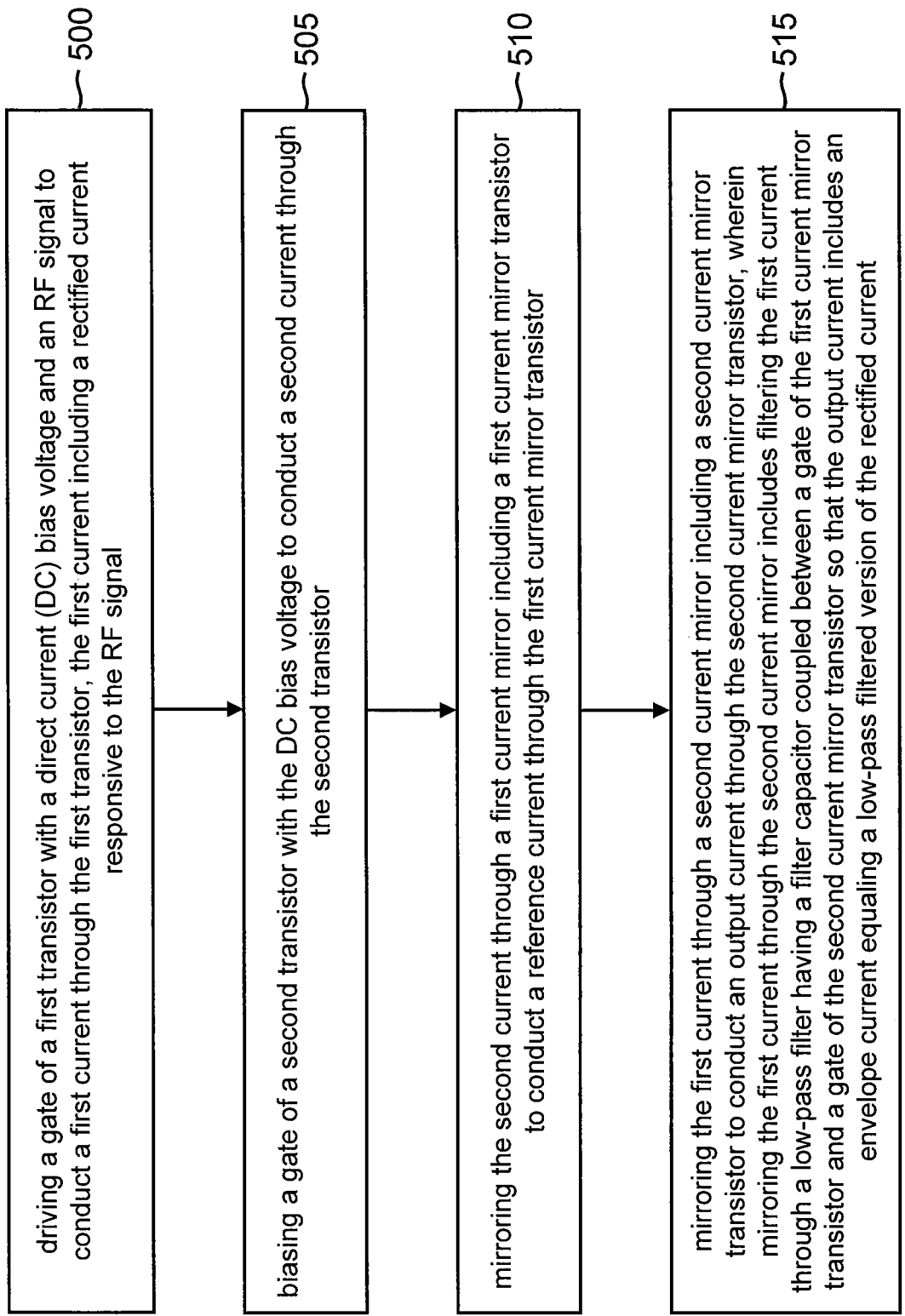

RF SQUARE-LAW CIRCUIT

CROSS-REFERENCE TO RELATED APPLICATION

This application claims priority to and the benefit of U.S. Provisional Application No. 62/725,911 filed Aug. 31, 2018.

TECHNICAL FIELD

This application relates to RF power detectors, and more particularly to high-density voltage-to-current square-law circuits.

BACKGROUND

The square law behavior of a metal-oxide semiconductor field effect transistor (MOSFET) may be utilized to recover the envelope from a modulated radio frequency (RF) signal. In particular, the drain current for a MOSFET in saturation is proportional to the square of the difference between the gate voltage and the transistor threshold voltage for the MOSFET. The resulting squaring of the drain current rectifies the RF carrier and its even harmonics so that MOSFET rectification is commonly exploited in receivers to recover the envelope of a modulated RF signal. For example, a MOSFET voltage-to-current (V/I) square-law circuit functions to recover the envelope of a modulated RF signal in applications such as a peak detector in an automatic gain control (AGC) circuit.

An example V/I square-law circuit 100 is shown in FIG. 1. A bias voltage ($V_{bias}$) signal biases the gate of a first n-type metal-oxide semiconductor (NMOS) transistor M1 and the gate of a second NMOS transistor M2 through a pair of resistors R1 so that transistors M1 and M2 are biased in the saturation mode (or the sub-threshold mode) to each conduct a DC bias current But transistor M1 is also conducting a rectified current because an RF input signal ($RF_{in}$) drives the gate of transistor M1 through an input capacitor Cm. The total current conducted by transistor M1 is thus a sum of the DC bias current $I_1$ and the rectified current. This total current is mirrored by a first current mirror. In particular, a first diode-connected p-type metal-oxide semiconductor (PMOS) has its drain and gate connected to the drain of transistor M1. The gate of diode-connected transistor P1 couples through a first resistor R2 to the gate of a PMOS current mirror transistor P2 to form the first current mirror with diode-connected transistor P1. The drain of current mirror transistor P2 thus mirrors the DC bias current $I_1$ conducted through the drain of transistor M1. With regard to mirroring the rectified current note that although this current is rectified, it will have a high-frequency amplitude modulation due to a rectified RF carrier from the RF input signal and its even harmonics. A peak detector could respond to this high-frequency amplitude modulation undesirably. Thus, the gate of current mirror transistor P2 couples to a power supply node supplying a power supply voltage VDD through a filter capacitor $C_{Filter}$ that forms a low-pass filter with first resistor R2. An envelope current $i_1$ conducted by current mirror transistor P2 will thus correspond to the envelope of the RF input signal without responding to the RF carrier and its harmonics due to the low-pass filtering from resistor R2 and filter capacitor $C_{Filter}$. This low-pass filtering has no effect on the DC bias current $I_1$. Current mirror transistor P2 thus conducts a total current equaling a sum of the DC bias current $I_1$ and the envelope current $i_1$.

The DC bias current $I_1$ conducted by transistor M2 is also mirrored through a second current mirror formed by a diode-connected PMOS transistor P3 having its gate coupled to a gate of a PMOS current mirror transistor P4. The effects of first resistor R2 are duplicated by a matching second resistor R2 that couples the gate of diode-connected transistor P3 to the gate of current mirror transistor P4. The drain current for current mirror transistor P4 will thus equal the DC bias current $I_1$ also conducted by current mirror transistor P2. A peak detector may then determine the peak power of the envelope responsive to a difference between the drain currents for current mirror transistors P2 and P4. However, note that the frequency response for the low-pass filter includes an RC pole proportional to $R2*C_{Filter}$. It is conventional to require a settling time from the RC pole to be substantial (e.g., 1 µs) to adequately smooth the envelope. In addition, circuit 100 often requires high sensitivity. The settling time and sensitivity requirements thus force the capacitor $C_{Filter}$ to be relatively large, which then demands die space.

Accordingly, there is a need in the art for a more compact integrated V/I square-law circuit.

SUMMARY

A circuit such as a V/I square-law circuit is provided that includes a first transistor biased by a DC bias voltage and an RF input signal. The first transistor will thus conduct a first current having a DC component responsive to the DC bias voltage and having a rectified component responsive to the RF input signal. The DC bias voltage also biases a second transistor so that the second transistor conducts a second current that is equal to or proportional to the DC component depending upon the sizes of the first and second transistors.

The V/I square-law circuit also includes a first current mirror and a second current mirror. The first current mirror includes a first current mirror transistor that conducts an output current responsive to a mirroring of the first current through the first current mirror. Similarly, the second current mirror includes a second current mirror transistor that conducts a reference current responsive to a mirroring of the second current through the second current mirror.

The V/I square-law circuit further includes a low-pass filter having a filter capacitor coupled between a gate of the first current mirror transistor and the second current mirror transistor. The low-pass filter filters the rectified component of the current conducted by the first transistor so that a difference between the output current and the reference current is proportional to an envelope of the RF input signal. Because of the coupling of the two current mirrors through the filter capacitor, the time constant of the low-pass filter may be advantageously large despite a relatively small capacitance for the filter capacitor. In this fashion, the circuit may be compact while still satisfying the desired time constant.

These and other advantageous features may be better appreciated through the following detailed description.

BRIEF DESCRIPTION OF THE DRAWINGS

FIG. 5 is a flowchart for a method of operation for an improved V/I square-law circuit in accordance with an aspect of the disclosure.

Embodiments of the present disclosure and their advantages are best understood by referring to the detailed description that follows. It should be appreciated that like reference numerals are used to identify like elements illustrated in one or more of the figures.

DETAILED DESCRIPTION

Figure 1:
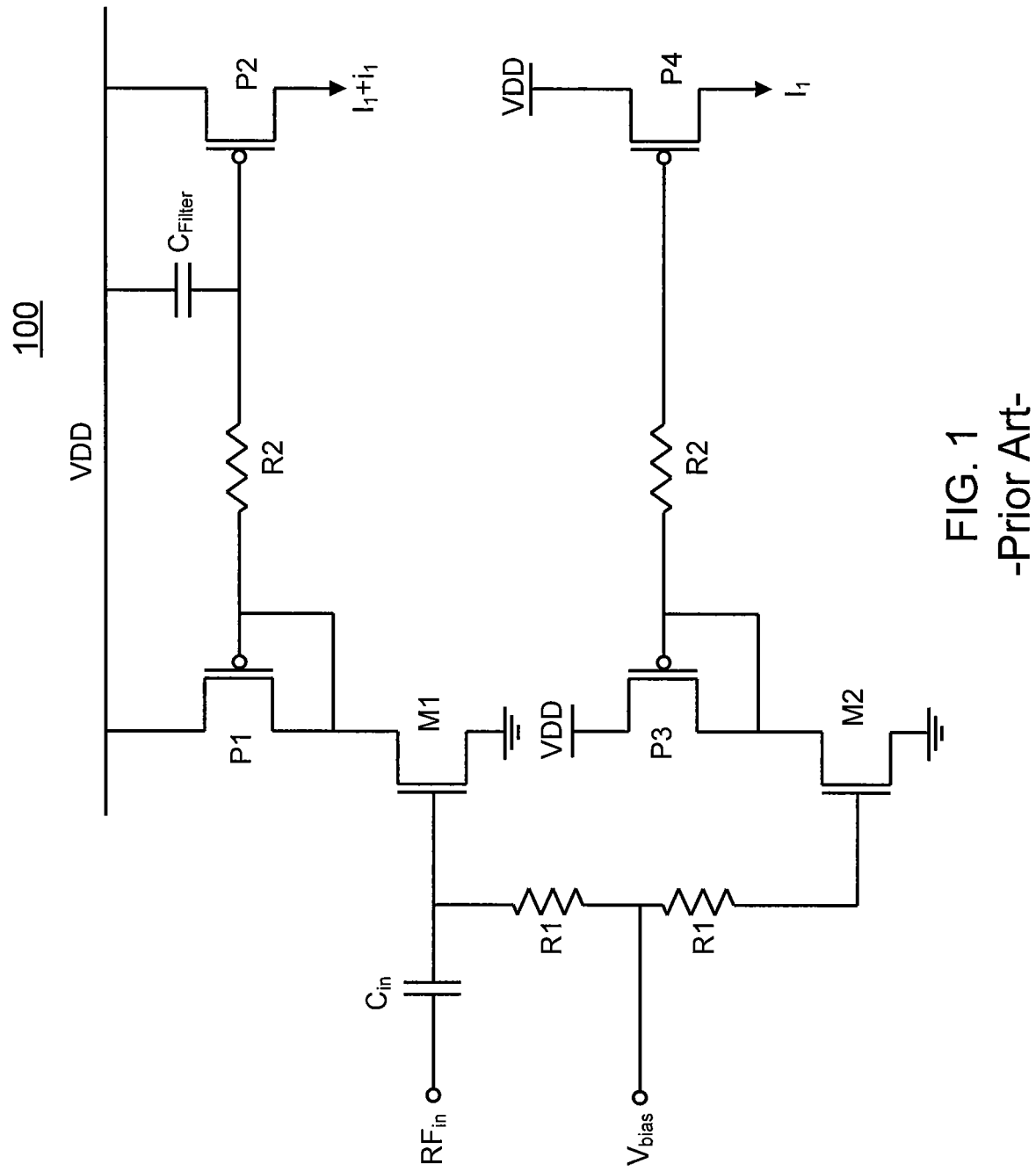
FIG. 1 is a circuit diagram of a conventional V/I square-law circuit.
Figure 2:
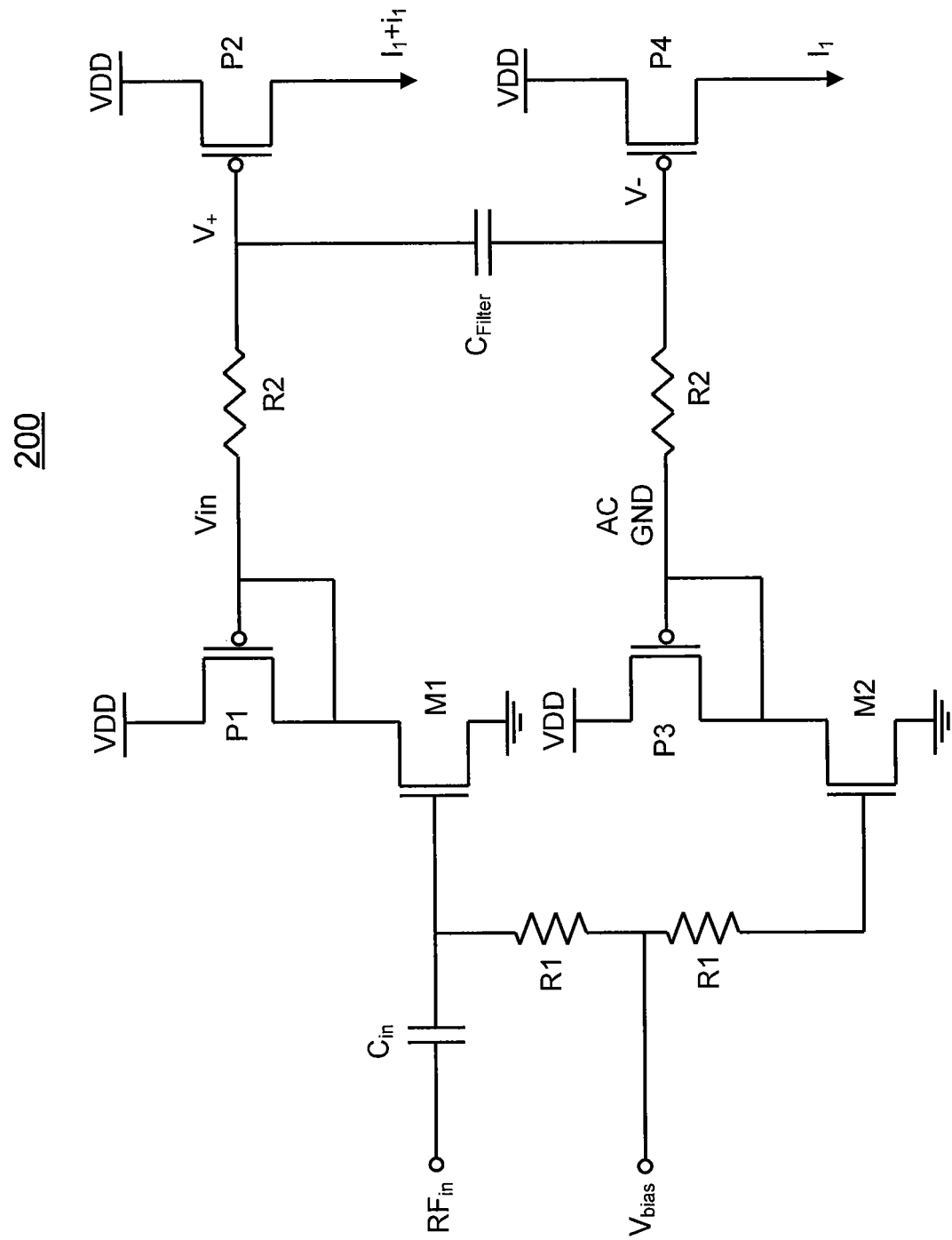
FIG. 2 is a circuit diagram of a first improved V/I square-law circuit having increased density and reduced noise in accordance with an aspect of the disclosure.

The following discussion is directed to an improved V/I square-law circuit that is advantageously compact while providing a relatively-large time constant for filtering the envelope of an RF signal. Although denoted herein as a V/I square-law circuit, it will be appreciated that each V/I/square-law circuit disclosed herein may also be denoted as a nonlinear voltage-to-current converter, a full-wave rectifier, or an exponential detector. An example improved V/I square-law circuit 200 is shown in FIG. 2. As discussed with regard to conventional V/I square-law circuit 100, a DC bias voltage ($V_{bias}$) signal biases the gate of first n-type metal-oxide semiconductor (NMOS) transistor M1 and also the gate of second NMOS transistor M2 through a pair of resistors R1 so that transistors M1 and M2 are biased in the saturation mode (or sub-threshold mode). A voltage source (not illustrated) providing the bias voltage may couple to the pair of resistors R1 through a coupling capacitor (not illustrated). Since transistor M2 may be matched to transistor M1 and each has the same DC bias, both transistors M2 and M1 will conduct the same DC bias current $I_1$ in some embodiments. Alternatively, the DC bias current conducted by transistor M2 may be proportional to the DC bias current $I_1$ as determined by a size proportionality of transistor M2 to transistor M1. As also discussed with regard to conventional V/I square-law circuit 100, the DC bias current $I_1$ conducted by each transistor M1 and M2 is mirrored through a corresponding current mirror. In that regard, a diode-connected transistor P1 has its drain and gate connected to the drain of transistor M1. The source of diode-connected transistor P1 connects to a power supply node providing a power supply voltage VDD. The gate of diode-connected transistor P1 couples through a first resistor R2 to the gate of a current mirror transistor P2 to form a first current mirror. The source of current mirror transistor P2 is also connected to the power supply node for the power supply voltage VDD. The drain of current mirror transistor P2 thus mirrors the DC bias current $I_1$ conducted through transistor M1. In alternative embodiments, current mirror transistor P2 may be a scaled version of diode-connected transistor P1 so that the DC current conducted by current mirror transistor P2 is a scaled version of the DC bias current $I_1$ conducted by transistor M1.

As also discussed with regard to conventional V/I square-law circuit 100, the DC bias current $I_1$ conducted by transistor M2 in V/I square-law circuit 200 is also mirrored through a diode-connected transistor P3 that forms a second current mirror with a current mirror transistor P4. The gate of diode-connected transistor P3 couples to the gate of current mirror transistor P4 through a second resistor R2. The source for diode-connected transistor P3 and the source for current mirror transistor P4 are both connected to the power supply node for the power supply voltage VDD. Current mirror transistor P4 conducts the mirrored DC bias current $I_1$ conducted by transistor M2.

In addition to the DC bias voltage $V_{bias}$, an RF input signal ($RF_{in}$) at an RF input node drives the gate of transistor M1 through an input capacitor $C_{in}$. But the RF input signal does not affect the DC bias for transistor M2. In particular, the DC bias voltage $V_{bias}$ couples from a bias voltage node through the pair of resistors R1 to bias the gates of transistors M1 and M2. Each resistor R1 is relatively large so that the resulting large resistance prevents the RF input signal from influencing the DC bias on transistor M2 in conjunction with the low impedance of the voltage source (not illustrated) that maintains the DC bias voltage $V_{bias}$. The RF input signal thus only drives the gate of transistor M1 to force it to conduct a rectified current. A node at the gate of transistor M1 may thus be designated as a bias voltage and RF signal node since it carries both the RF input signal and the DC bias voltage. Since the envelope for the rectified current is produced by the relatively high-frequency RF carrier and its even harmonics, a peak detector could undesirably respond to the amplitude variations of these higher-frequency signals instead of responding to the envelope. A low-pass filter formed by resistors R2 and a capacitor $C_{Filter}$ filters out these higher-frequency signals such that an envelope current $i_1$ conducted by current mirror transistor P2 follows the desired envelope of the RF input signal. Filter capacitor $C_{Filter}$ connects between the gates of current mirror transistors P2 and P4. A peak detector (not illustrated in FIG. 2 but discussed further below) responds to a difference between the currents conducted by current mirror transistors P2 and P4, which equals the envelope current $i_1$. The output for circuit 200 is thus the envelope current $i_1$.

The time constant for the low-pass filter formed by resistors R2 and filter capacitor CFilter is 2*R2*CFilter, where R2 is the resistance of each resistor R2 and $C_{Filter}$ is the capacitance of filter capacitor $C_{Filter}$. The resulting time constant for the low-pass filter in V/I square-law circuit 200 is thus twice as large as the time constant for the low-pass filter in conventional V/I square-law circuit 100 without requiring a change in the capacitance of filter capacitor $C_{Filter}$ or in the resistance of resistors R2. This is quite advantageous in providing a sufficiently-low pole frequency to prevent the envelope current $i_1$ from responding to the high-frequency carrier and its harmonics instead of the envelope while still maintaining a low-density design. In addition, note that each resistor R2 functions as a noise source. The high-frequency components of this resistor-introduced noise are filtered out by filter capacitor $C_{Filter}$, which functions as a short circuit to such high-frequency signals. But in conventional V/I square-law circuit 100, the noise from resistor R2 for the second current mirror formed by diode-connected transistor P3 and current mirror transistor P4 receives no such filtering. V/I square-law circuit 200 is thus not only advantageously dense compared to conventional V/I square-law circuit 100 but also has less noise and thus higher fidelity.

The gate voltage for diode-connected transistor P1 may be deemed to form an input voltage Vin for the low-pass filter formed by the pair of resistors R2 and filter capacitor $C_{Filter}$ whereas the gate voltage for diode-connected transistor P3 may be deemed to form an AC ground (AC GND) input for the low-pass filter. The low-pass filter converts the single-ended input voltage Vin into a differential output voltage defined between a positive voltage v+ at the gate of current mirror transistor P2 and a negative voltage v− at the gate of current mirror transistor P4. It can be shown that the differential output voltage v+ minus v− for the low-pass filter may be expressed as:

$$v_{out} = v^+ - v^- = \frac{v_{in}}{1 + s(2C_{Filter}R_2)}$$

where the variable s equals the complex unit integer j times the angular frequency ω. At the same pole frequency, V/I square-law circuit 200 thus requires half the area for filter capacitor $C_{Filter}$ as compared to conventional V/I square-law circuit 100.

Figure 3:
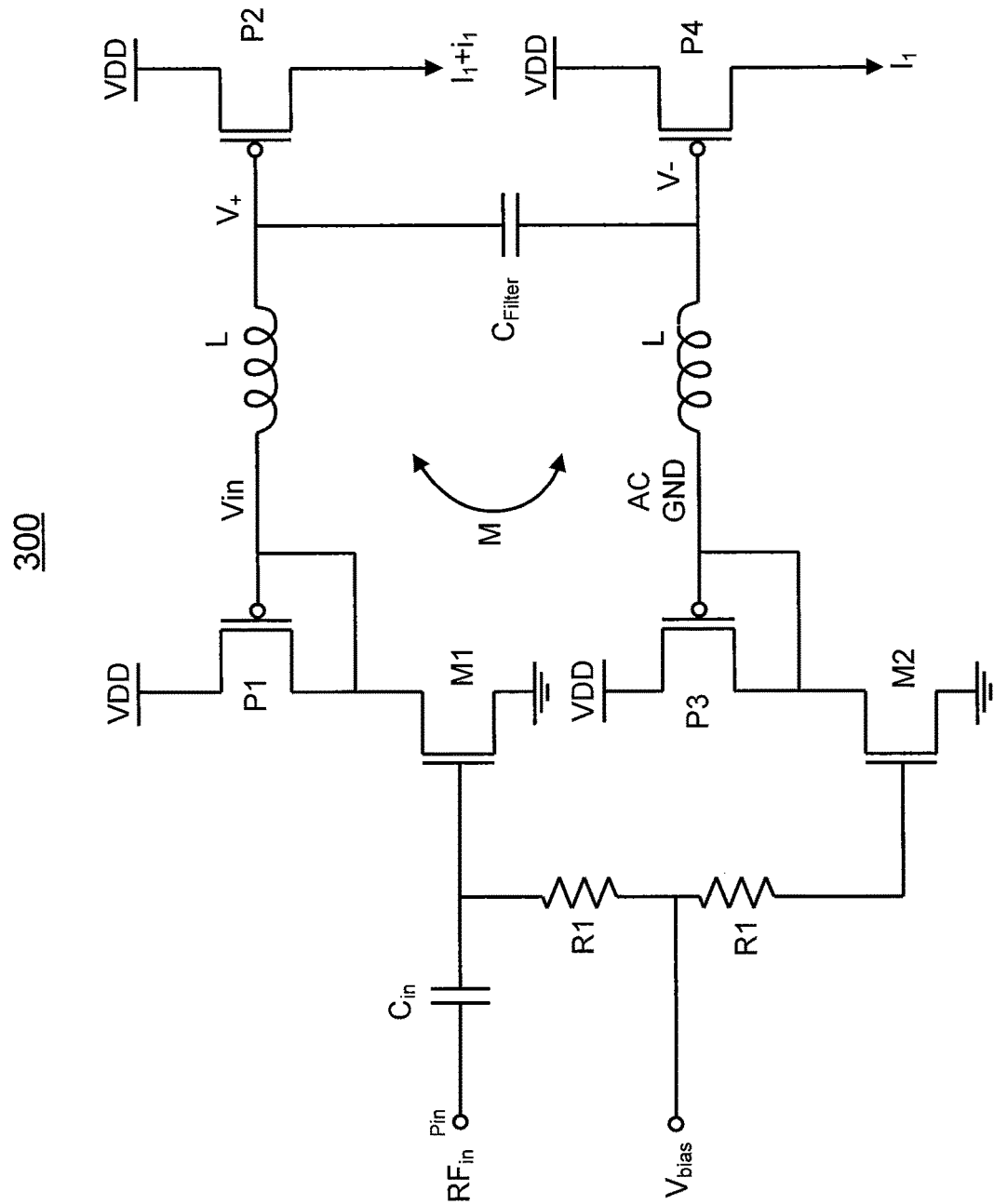
FIG. 3 is a circuit diagram of a second improved V/I square-law circuit having increased density and reduced noise in accordance with an aspect of the disclosure.

In an alternative embodiment, resistors R2 may be replaced by a transformer formed by a pair of coupled coils (inductors L) as shown for a V/I square-law circuit 300 of FIG. 3. V/I square-law circuit 300 is analogous to V/I square-law circuit 200 except that resistors R2 have been replaced by inductors L having a mutual inductance of M. Each inductor L may have the same inductance. V/I square-law circuit 300 includes the first current mirror formed by diode-connected transistor P1 and current mirror transistor P2. A first inductor L couples between the gates of diode-connected transistor P1 and current mirror transistor P2. Current mirror transistor P2 conducts a low-pass filtered version of a current conducted by transistor M2 in response to the DC bias voltage Vbias and the RF input signal (RF$_{in}$). The RF input signal biases the gate of transistor M1 through the input capacitor $C_{in}$. V/I square-law circuit 300 also includes the second current mirror formed by diode-connected transistor P3 and current mirror transistor P4 that mirrors the DC bias current $I_1$ current conducted by transistor M2. A second inductor L1 couples between the gates of diode-connected transistor P3 and current mirror transistor P4. A voltage source (not illustrated) biases the gates of transistors M1 and M2 with the DC bias voltage $V_{bias}$ through the pair of resistors R1. The filter capacitor $C_{Filter}$ couples between the gates of current mirror transistors P2 and P4. It can be shown that the differential output voltage v+ minus v− for V/I square-law circuit 300 may be expressed as:

$$v_{out} = v^+ - v^- = \frac{v_{in}}{1 + s^2(2LC(1+k))}$$

where k is the k-factor for the transformer formed by coupled inductors L. The resulting low-pass filter for V/I square-law circuit 300 thus has a double pole having a frequency of:

$$\omega_0 = \frac{1}{\sqrt{2LC(1+k)}}$$

If the k-factor equals 1, the double pole frequency equals $1/(2\sqrt{LC_{Filter}})$. Note that V/I square-law circuit 300 advantageously provides this double pole frequency without the noise-contributing effects of using resistors.

The current conducted by transistor M1 may be deemed to be a first current conducted by a first transistor. This first current is then mirrored by the first current mirror formed by diode-connected transistor P1 and current mirror transistor P2 to form an output current conducted by current mirror transistor P2. Similarly, the current conducted by transistor M2 may be deemed to be a second current conducted by a second transistor. This second current is then mirrored by the second current mirror formed by diode-connected transistor P3 and current mirror transistor P4 to form a reference current conducted by current mirror transistor P4. With this terminology in mind, the first and second current mirrors along with the low-pass filter discussed with regard to V/I square-law circuits 200 and 300 may be deemed to form a means for mirroring and low-pass filtering the first current into the output current and for mirroring and low-pass filtering the second current into the reference current.

Figure 4:
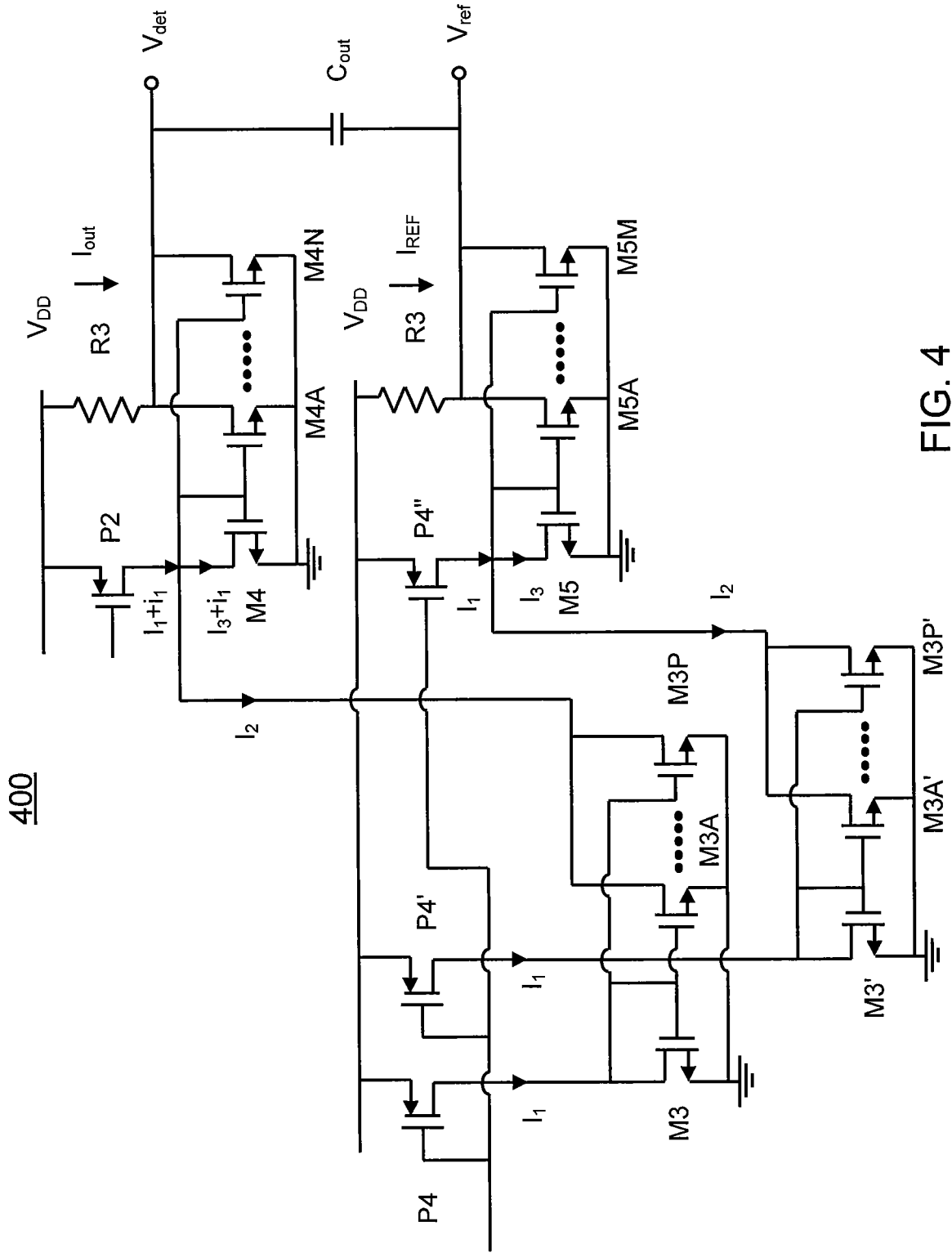
FIG. 4 illustrates a peak detector including the improved V/I square-law circuit of FIG. 2 or FIG. 3 in accordance with an aspect of the disclosure.

The high fidelity and density of the disclosed V/I square-law circuits may be exploited in a number of applications such as by a peak detector 400 shown in FIG. 4. For illustration clarity, only the current mirror transistors P2 and P4 are shown for the V/I square-law circuit of FIG. 4, which may include the low-pass filter of either FIG. 2 or FIG. 3. The drain of current mirror transistor P4 drives the drain and gate of a diode-connected NMOS transistor M3 in a configurable current mirror configuration with a plurality of P (P being a positive integer) selectable current mirror NMOS transistors M3A through M3P. Each current mirror transistor M3A through M3P may be selected by a corresponding switch (not illustrated) such that it either contributes to or does not participate in the current mirroring. Should one of the switches be closed, the corresponding one of the current mirror transistors M3A through M3P has its gate connected to the gate of transistor M3. The DC bias current $I_1$ conducted by current mirror transistor P4 is thus mirrored into a total current $I_2$ conducted by the selected transistors in the plurality of P selectable current mirror transistors M3A though M3P.

The drains of the plurality of P selectable current mirror transistors M3A through M3P all connect to the drain of current mirror transistor P2. The current $I_1+i_1$ conducted by the drain of current mirror transistor P2 is thus split into current $I_2$ and a remaining current $I_3+i_1$. The current I3+i1 is mirrored by a current mirror formed by a diode-connected NMOS transistor M4 in a current mirror configuration with a plurality of N (N being a positive integer) selectable current mirror transistors M4A through M4N. Since the drain of current mirror transistor P2 connects to the drain of diode-connected transistor M4, the current $I_3+i_1$ is thus mirrored by the selected ones of current mirror transistors M4A through M4N. Note that the envelope may be relatively high power. In such a case, diode-connected transistor M4 may be undesirably driven into the triode region of operation instead of saturation. The subtraction of current $I_2$ to form current $I_3+i_1$ advantageously keeps diode-connected transistor M4 in saturation. Depending upon the strength of the envelope, current $I_2$ may be increased or decreased accordingly by the appropriate selection from the plurality of P current mirror transistors M3A through M3P.

The selection of current mirror transistors M4A through M4N occurs through, for example, corresponding switches that are not shown for illustration clarity. The drains of current mirror transistors M4A through M4N connect to the power supply node supplying the power supply voltage VDD through a first resistor R3. Depending upon the number of selected transistors from the plurality of N current mirror transistors M4A through M4N, a final mirrored output current $I_{out}$ will be conducted through the first resistor R3 to develop a power detector output voltage ($V_{det}$) at an output node at the drains of current mirror transistors M4A through M4N.

To generate a reference voltage to compare to the power detector output voltage, power detector 400 also includes a PMOS current mirror transistor P4" and a PMOS current mirror transistor P4'. The sources for current mirror transistors P4" and P4' are tied to the power supply node whereas their gates are tied to the gate for current mirror transistor P4. If current mirror transistors P4" and P4" are both matched to current mirror transistor P4, current mirror transistors P4" and P4' will thus both conduct the current $I_1$. The drain of current mirror transistor P4' drives the gate and drain of a diode-connected NMOS transistor M3' that is in a current mirror configuration with a plurality of P selectable current mirror NMOS transistors M3A' through M3P' that all have their drains connected to the drain of current mirror transistor P4". The selection from the plurality of P selectable current mirror transistors M3A' through M3P' matches the selection from the plurality of P selectable current mirror transistors M3A through M3P. The current $I_1$ conducted by the drain of current mirror transistor P4" is thus split into a current $I_2$ conducted by the selected transistors from the plurality of P selectable current mirror transistors M3A' through M3P'. The remainder of the current $I_1$ conducted by the drain of current mirror transistor P4" equals another version of current $I_3$, which is driven into a drain of a diode-connected transistor M5. Diode-connected transistor M5 is in a current mirror configuration with a plurality of M selectable current mirror transistors M5A through M5M. The selection from this plurality of M transistors matches the gain provided by the selection from current mirror transistors M4A through M4N. The drains of current mirror transistors M5A through M5M couple to the power supply node through a second resistor R3. Thus, a reference output current $I_{REF}$ conducted by the second resistor R3 will substantially match the DC component for the output current $I_{out}$. The drains of current mirror transistors M5A and M5M also form a reference voltage output node for a reference voltage $V_{ref}$ for voltage detector 400. The conduction of the reference output current through second resistor R3 produces the reference voltage $V_{ref}$ at the reference output node. The differential output voltage formed by the difference between peak detector output voltage $V_{det}$ and the reference voltage $V_{ref}$ is smoothed by an output capacitor Cout.

A method of operation for an example V/I square-law circuit will now be discussed with reference to the flowchart of FIG. 5. The method includes an act 500 of driving a gate of a first transistor with a direct current (DC) bias voltage and an RF signal to conduct a first current through the first transistor, the first current including a rectified current responsive to the RF signal. The operation of transistor M1 as discussed above for V/I square-law circuits 200 and 300 is an example of act 500. The method further includes an act 505 of biasing a gate of a second transistor with the DC bias voltage to conduct a second current through the second transistor. The biasing of transistor M2 in V/I square-law circuits 200 and 300 to conduct the DC bias current is an example of act 505. In addition, the method includes an act 510 of mirroring the second current through a first current mirror including a first current mirror transistor to conduct a reference current through the first current mirror transistor. The mirroring of the DC bias current $I_1$ through current mirror transistor P4 in V/I square-law circuits 200 and 300 is an example of act 510. Finally, the method includes an act 515 of mirroring the first current through a second current mirror including a second current mirror transistor to conduct an output current through the second current mirror transistor, wherein mirroring the first current through the second current mirror includes filtering the first current through a low-pass filter having a filter capacitor coupled between a gate of the first current mirror transistor and a gate of the second current mirror transistor so that the output current includes an envelope current equaling a low-pass filtered version of the rectified current. The mirroring and low-pass filtering of the current conducted by transistor M1 to form the currents $I_1$ and $i_1$ conducted by current mirror transistor P2 in V/I square-law circuits 200 and 300 is an example of act 515.

It will be appreciated that many modifications, substitutions and variations can be made in and to the materials, apparatus, configurations and methods of use of the devices of the present disclosure without departing from the scope thereof. For example, transistors M1 and M2 may be replaced by PMOS transistors in alternative embodiments in which the transistors are of opposite polarity. In such embodiments, the current-mirror transistors P1, P2, P3, and P4 would be replaced by NMOS transistors. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A square-law circuit comprising:
    a first transistor having a gate coupled to a bias voltage and RF signal node for a bias voltage and an RF signal, the first transistor configured to conduct a first current responsive to the bias voltage and to the RF signal;
    a first current mirror configured to mirror the first current into an output current conducted by a first current mirror transistor;
    a second transistor having a gate coupled to a bias voltage node for the bias voltage, the second transistor configured to conduct a second current responsive to the bias voltage;
    a second current mirror configured to mirror the second current into a reference current conducted by a second current mirror transistor; and
    a low-pass filter including a filter capacitor coupled between a gate of the first current mirror transistor and a gate of the second current mirror transistor.

2. The square-law circuit of claim 1, wherein the first current mirror includes a first diode-connected transistor having a gate coupled to the gate of the first current mirror transistor through a first resistor, and wherein the second current mirror includes a second diode-connected transistor having a gate coupled to the gate of the second current mirror transistor through a second resistor, and wherein the low-pass filter comprises the filter capacitor, the first resistor, and the second resistor.

3. The square-law circuit of claim 2, wherein the first transistor and the second transistor each comprises an n-type metal-oxide semiconductor (NMOS) transistor.

4. The square-law circuit of claim 2, wherein the first diode-connected transistor, the second diode-connected transistor, the first current mirror transistor, and the second current mirror transistor each comprises a p-type metal-oxide semiconductor (PMOS) transistor.

5. The square-law circuit of claim 2, further comprising:
    an RF input node for the RF signal; and
    an input capacitor, wherein the RF input node is coupled to the bias voltage and RF signal node through the input capacitor.

6. The square-law circuit of claim 5, further comprising:
    a bias voltage input node for the bias voltage;
    a third resistor; and
    a fourth resistor, wherein the bias voltage input node is coupled to the bias voltage and RF signal node through the third resistor and is coupled to the gate of the second transistor through the fourth resistor.

7. The square-law circuit of claim 6, wherein a resistance for the third resistor equals a resistance for the fourth resistor.

8. The square-law circuit of claim 1, wherein the first current mirror includes a first diode-connected transistor having a gate coupled to the gate of the first current mirror transistor through a first inductor, and wherein the second current mirror includes a second diode-connected transistor having a gate coupled to the gate of the second current mirror transistor through a second inductor configured to form a transformer with the first inductor, and wherein the low-pass filter comprises the filter capacitor, the first inductor, and the second inductor.

9. The square-law circuit of claim 8, wherein an inductance for the first inductor equals an inductance for the second inductor.

10. The square-law circuit of claim 8, wherein the first transistor and the second transistor each comprises an NMOS transistor.

11. The square-law circuit of claim 10, wherein the first diode-connected transistor, the second diode-connected transistor, the first current mirror transistor, and the second current mirror transistor each comprises a PMOS transistor.

12. The square-law circuit of claim 8, further comprising:
an RF input node for the RF signal; and
an input capacitor, wherein the RF input node is coupled to the bias voltage and RF signal node through the input capacitor.

13. The square-law circuit of claim 12, further comprising:
a bias voltage node for the bias voltage;
a first resistor; and
a second resistor, wherein the bias voltage node is coupled to the gate of the first transistor through the first resistor and is coupled to the gate of the second transistor through the second resistor.

14. The square-law circuit of claim 13, wherein a resistance for the first resistor equals a resistance for the second resistor.

15. The square-law circuit of claim 1, further comprising a peak detector configured to form a differential output voltage responsive to a difference between the output current and the reference current.

16. A method of detecting an envelope for an RF signal, comprising:

driving a gate of a first transistor with a direct current (DC) bias voltage and the RF signal to conduct a first current through the first transistor, the first current including a rectified current responsive to the RF signal;

biasing a gate of a second transistor with the DC bias voltage to conduct a second current through the second transistor;

mirroring the second current through a first current mirror including a first current mirror transistor to conduct a reference current through the first current mirror transistor; and mirroring the first current through a second current mirror including a second current mirror transistor to conduct an output current through the second current mirror transistor, wherein mirroring the first current through the second current mirror includes filtering the first current through a low-pass filter having a filter capacitor coupled between a gate of the first current mirror transistor and a gate of the second current mirror transistor so that the output current includes an envelope current equaling a low-pass filtered version of the rectified current.

17. The method of claim 16, further comprising filtering the second current through the low-pass filter so that the reference current equals a low-pass filtered version of the second current.

18. The method of claim 16, further comprising determining a power of an envelope for the RF signal responsive to a difference between the output current and the reference current.

19. A square-law circuit, comprising:
a first current mirror configured to mirror a combination of a rectified input current responsive to an RF input signal and a bias current into an output current, the first current mirror including a first current mirror transistor;
a second current mirror configured to mirror the bias current into a reference current, the second current mirror including a second current mirror transistor; and
a low-pass filter including a filter capacitor coupled between a gate of the first current mirror transistor and a gate of the second current mirror transistor.

20. The square-law circuit of claim 19, wherein the low-pass filter is a resistor-capacitor low-pass filter.

* * * * *